United States Patent
Sherb et al.

(10) Patent No.: US 8,572,236 B2
(45) Date of Patent: Oct. 29, 2013

(54) DISTRIBUTING SERVICES IN GRAPH-BASED COMPUTATIONS

(75) Inventors: Igor Sherb, Natick, MA (US); Joseph Skeffington Wholey, III, Belmont, MA (US); Larry W. Allen, Sudbury, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 11/836,349

(22) Filed: Aug. 9, 2007

(65) Prior Publication Data

US 2008/0049022 A1 Feb. 28, 2008

Related U.S. Application Data

(60) Provisional application No. 60/836,745, filed on Aug. 10, 2006.

(51) Int. Cl.
*G06F 15/173* (2006.01)
(52) U.S. Cl.
USPC .......................................... 709/224; 709/223
(58) Field of Classification Search
USPC ................... 709/223, 106, 224; 718/106
See application file for complete search history.

(56) References Cited

U.S. PATENT DOCUMENTS

| | | | |
|---|---|---|---|
| 3,662,343 A | 5/1972 | Goldstein et al. | |
| 3,662,401 A | 5/1972 | Collins et al. | |
| 4,922,418 A | 5/1990 | Dolecek | |
| 4,972,314 A | 11/1990 | Getzinger et al. | |
| 5,127,104 A | 6/1992 | Dennis | |
| 5,276,899 A * | 1/1994 | Neches | 709/240 |
| 5,280,619 A | 1/1994 | Wang | |
| 5,301,336 A | 4/1994 | Kodosky | |
| 5,323,452 A | 6/1994 | Dickman et al. | |
| 5,333,319 A | 7/1994 | Silen | |
| 5,357,632 A | 10/1994 | Pian et al. | |
| 5,495,590 A | 2/1996 | Comfort et al. | |
| 5,630,047 A | 5/1997 | Wang | |
| 5,692,168 A | 11/1997 | McMahan | |
| 5,701,400 A | 12/1997 | Amardo | |
| 5,712,971 A | 1/1998 | Stanfill et al. | |
| 5,745,778 A * | 4/1998 | Alfieri | 712/1 |
| 5,802,267 A | 9/1998 | Shirakihara et al. | |
| 5,805,462 A | 9/1998 | Poirot et al. | |
| 5,857,204 A | 1/1999 | Lordi et al. | |
| 5,923,832 A | 7/1999 | Shirakihara et al. | |
| 5,924,095 A | 7/1999 | White | |
| 5,930,794 A | 7/1999 | Linenbach et al. | |

(Continued)

FOREIGN PATENT DOCUMENTS

| | | |
|---|---|---|
| JP | 64-013189 | 1/1989 |
| JP | 06-236276 | 8/1994 |

(Continued)

OTHER PUBLICATIONS

International Search Report dated Sep. 16, 2008 in PCT Application No. PCT/US07/75576, 2 pages.

(Continued)

*Primary Examiner* — Kenny Lin
(74) *Attorney, Agent, or Firm* — Fish & Richardson P.C.

(57) ABSTRACT

A service request is processed according to a computation graph associated with the service by receiving inputs for the computation graph from a service client, providing the inputs to the computation graph as records of a data flow, receiving output from the computation graph, and providing the output to the service client.

Data flows are processed concurrently in a graph-based computation by potentially concurrent execution of different types of requests, potentially concurrent execution of similar request types, and/or potentially concurrent execution of work elements within a request.

71 Claims, 8 Drawing Sheets

(56) References Cited

U.S. PATENT DOCUMENTS

| | | | |
|---|---|---|---|
| 5,933,640 A | 8/1999 | Dion | |
| 5,966,072 A * | 10/1999 | Stanfill et al. | 340/440 |
| 5,999,729 A | 12/1999 | Tabloski, Jr. et al. | |
| 6,006,242 A | 12/1999 | Poole et al. | |
| 6,012,094 A | 1/2000 | Leymann | |
| 6,014,670 A | 1/2000 | Zamanian et al. | |
| 6,016,516 A | 1/2000 | Horikiri | |
| 6,032,158 A | 2/2000 | Mukhopadhhyay et al. | |
| 6,038,558 A | 3/2000 | Powers et al. | |
| 6,044,211 A * | 3/2000 | Jain | 716/102 |
| 6,044,374 A | 3/2000 | Nesamoney et al. | |
| 6,044,394 A | 3/2000 | Cadden et al. | |
| 6,088,716 A | 7/2000 | Stanfill et al. | |
| 6,145,017 A | 11/2000 | Ghaffari | |
| 6,173,276 B1 | 1/2001 | Kant et al. | |
| 6,208,345 B1 | 3/2001 | Sheard et al. | |
| 6,256,637 B1 | 7/2001 | Venkatesh et al. | |
| 6,259,988 B1 | 7/2001 | Galkowski et al. | |
| 6,272,650 B1 | 8/2001 | Meyer et al. | |
| 6,301,601 B1 | 10/2001 | Helland | |
| 6,314,114 B1 | 11/2001 | Coyle et al. | |
| 6,324,437 B1 | 11/2001 | Frankel et al. | |
| 6,330,008 B1 | 12/2001 | Razdow et al. | |
| 6,339,775 B1 | 1/2002 | Zamanian et al. | |
| 6,400,996 B1 | 6/2002 | Hoffberg et al. | |
| 6,401,216 B1 | 6/2002 | Meth et al. | |
| 6,437,796 B2 | 8/2002 | Sowizral et al. | |
| 6,449,711 B1 | 9/2002 | Week | |
| 6,480,876 B2 | 11/2002 | Rehg et al. | |
| 6,496,961 B2 | 12/2002 | Gupta et al. | |
| 6,538,651 B1 | 3/2003 | Hayman et al. | |
| 6,584,581 B1 | 6/2003 | Bay et al. | |
| 6,608,628 B1 | 8/2003 | Ross et al. | |
| 6,611,862 B2 | 8/2003 | Reisman | |
| 6,651,234 B2 | 11/2003 | Gupta et al. | |
| 6,654,907 B2 | 11/2003 | Stanfill et al. | |
| 6,658,464 B2 | 12/2003 | Reisman | |
| 6,715,145 B1 | 3/2004 | Bowman-Amuah | |
| 6,728,879 B1 | 4/2004 | Atkinson | |
| 6,813,761 B1 | 11/2004 | Das et al. | |
| 6,816,825 B1 | 11/2004 | Ashar et al. | |
| 6,832,369 B1 | 12/2004 | Kryka et al. | |
| 6,848,100 B1 | 1/2005 | Wu et al. | |
| 6,879,946 B2 | 4/2005 | Rong et al. | |
| 7,062,483 B2 | 6/2006 | Ferrari et al. | |
| 7,082,604 B2 * | 7/2006 | Schneiderman | 718/100 |
| 7,085,426 B2 | 8/2006 | August | |
| 7,103,597 B2 | 9/2006 | McGovern | |
| 7,103,620 B2 | 9/2006 | Kunz et al. | |
| 7,130,484 B2 | 10/2006 | August | |
| 7,137,116 B2 * | 11/2006 | Parkes et al. | 718/102 |
| 7,164,422 B1 | 1/2007 | Wholey et al. | |
| 7,165,030 B2 | 1/2007 | Yi et al. | |
| 7,167,850 B2 | 1/2007 | Stanfill | |
| 7,316,001 B2 | 1/2008 | Gold et al. | |
| 7,356,819 B1 * | 4/2008 | Ricart et al. | 718/102 |
| 7,398,514 B2 | 7/2008 | Ulrich et al. | |
| 7,417,645 B2 | 8/2008 | Beda et al. | |
| 7,457,984 B2 | 11/2008 | Kutan | |
| 7,467,383 B2 | 12/2008 | Inchingolo et al. | |
| 7,505,975 B2 | 3/2009 | Luo | |
| 7,577,628 B2 | 8/2009 | Stanfill | |
| 7,636,699 B2 | 12/2009 | Stanfill | |
| 7,716,630 B2 | 5/2010 | Wholey et al. | |
| 7,840,949 B2 | 11/2010 | Schumacher et al. | |
| 7,870,556 B2 * | 1/2011 | Wholey et al. | 718/104 |
| 7,877,350 B2 | 1/2011 | Stanfill et al. | |
| 7,979,479 B2 | 7/2011 | Staebler et al. | |
| 2001/0055019 A1 | 12/2001 | Sowizral et al. | |
| 2002/0080181 A1 | 6/2002 | Razdow et al. | |
| 2002/0087921 A1 | 7/2002 | Rodriguez | |
| 2002/0091747 A1 | 7/2002 | Rehg et al. | |
| 2002/0091748 A1 | 7/2002 | Rehg et al. | |
| 2002/0111876 A1 | 8/2002 | Rudraraju et al. | |
| 2002/0129340 A1 | 9/2002 | Tuttle | |
| 2002/0147745 A1 | 10/2002 | Houben et al. | |
| 2002/0184616 A1 | 12/2002 | Chessell et al. | |
| 2003/0004771 A1 | 1/2003 | Yaung | |
| 2003/0023413 A1 | 1/2003 | Srinivasa | |
| 2003/0033432 A1 | 2/2003 | Simpson et al. | |
| 2003/0091055 A1 | 5/2003 | Craddock et al. | |
| 2003/0126240 A1 * | 7/2003 | Vosseler | 709/221 |
| 2003/0204804 A1 | 10/2003 | Petri et al. | |
| 2004/0006745 A1 | 1/2004 | Van Helden et al. | |
| 2004/0041838 A1 | 3/2004 | Adusumilli et al. | |
| 2004/0073529 A1 * | 4/2004 | Stanfill | 706/45 |
| 2004/0093559 A1 | 5/2004 | Amaru et al. | |
| 2004/0098452 A1 | 5/2004 | Brown et al. | |
| 2004/0107414 A1 | 6/2004 | Bronicki et al. | |
| 2004/0111469 A1 | 6/2004 | Manion et al. | |
| 2004/0148373 A1 | 7/2004 | Childress et al. | |
| 2004/0177099 A1 | 9/2004 | Ganesh et al. | |
| 2004/0205726 A1 | 10/2004 | Chedgey et al. | |
| 2004/0207665 A1 | 10/2004 | Mathur | |
| 2004/0210831 A1 | 10/2004 | Feng et al. | |
| 2004/0225657 A1 * | 11/2004 | Sarkar | 707/9 |
| 2004/0260590 A1 | 12/2004 | Golani et al. | |
| 2005/0021689 A1 * | 1/2005 | Marvin et al. | 709/220 |
| 2005/0034112 A1 | 2/2005 | Stanfill | |
| 2005/0039176 A1 | 2/2005 | Fournie | |
| 2005/0059046 A1 | 3/2005 | Labrenz et al. | |
| 2005/0086360 A1 | 4/2005 | Mamou et al. | |
| 2005/0097561 A1 | 5/2005 | Schumacher et al. | |
| 2005/0102670 A1 | 5/2005 | Bretl et al. | |
| 2005/0144277 A1 * | 6/2005 | Flurry et al. | 709/225 |
| 2005/0144596 A1 * | 6/2005 | McCullough et al. | 717/136 |
| 2005/0149935 A1 * | 7/2005 | Benedetti | 718/102 |
| 2005/0177531 A1 | 8/2005 | Bracewell | |
| 2005/0193056 A1 | 9/2005 | Schaefer et al. | |
| 2005/0216421 A1 | 9/2005 | Barry et al. | |
| 2005/0240621 A1 * | 10/2005 | Robertson et al. | 707/102 |
| 2005/0262470 A1 | 11/2005 | Gavrilov | |
| 2005/0289527 A1 | 12/2005 | Illowsky et al. | |
| 2006/0095722 A1 * | 5/2006 | Biles et al. | 712/34 |
| 2006/0098017 A1 | 5/2006 | Tarditi et al. | |
| 2006/0206872 A1 | 9/2006 | Krishnaswamy | |
| 2006/0294150 A1 | 12/2006 | Stanfill et al. | |
| 2006/0294459 A1 | 12/2006 | Davis et al. | |
| 2007/0011668 A1 | 1/2007 | Wholey et al. | |
| 2007/0022077 A1 | 1/2007 | Stanfill | |
| 2007/0035543 A1 | 2/2007 | David et al. | |
| 2007/0094211 A1 | 4/2007 | Sun et al. | |
| 2007/0118839 A1 | 5/2007 | Berstis et al. | |
| 2007/0139441 A1 | 6/2007 | Lucas et al. | |
| 2007/0143360 A1 | 6/2007 | Harris et al. | |
| 2007/0150429 A1 | 6/2007 | Huelsman et al. | |
| 2007/0174185 A1 | 7/2007 | McGovern | |
| 2007/0239766 A1 | 10/2007 | Papaefstathiou et al. | |
| 2007/0285440 A1 | 12/2007 | MacInnis et al. | |
| 2008/0126755 A1 | 5/2008 | Wu et al. | |
| 2008/0288608 A1 | 11/2008 | Johnson | |
| 2008/0294615 A1 | 11/2008 | Furuya et al. | |
| 2009/0030863 A1 | 1/2009 | Stanfill et al. | |
| 2009/0182728 A1 | 7/2009 | Anderson | |
| 2009/0193417 A1 | 7/2009 | Kahlon | |
| 2009/0224941 A1 | 9/2009 | Kansal et al. | |
| 2009/0327196 A1 | 12/2009 | Studer et al. | |
| 2010/0070955 A1 | 3/2010 | Kahlon | |
| 2010/0169137 A1 | 7/2010 | Jastrebski et al. | |
| 2010/0174694 A1 | 7/2010 | Staebler et al. | |
| 2010/0180344 A1 | 7/2010 | Malyshev et al. | |
| 2010/0211953 A1 | 8/2010 | Wakeling et al. | |
| 2010/0218031 A1 | 8/2010 | Agarwal et al. | |
| 2010/0281488 A1 | 11/2010 | Krishnamurthy et al. | |
| 2011/0078500 A1 | 3/2011 | Douros et al. | |
| 2011/0093433 A1 | 4/2011 | Stanfill et al. | |
| 2012/0054255 A1 | 3/2012 | Buxbaum | |

FOREIGN PATENT DOCUMENTS

| | | |
|---|---|---|
| JP | 08-278892 | 10/1996 |
| JP | 08-305576 | 11/1996 |
| JP | 63-231613 | 9/1998 |
| JP | 11-184766 | 7/1999 |

(56) References Cited

FOREIGN PATENT DOCUMENTS

| | | |
|---|---|---|
| JP | 2000-99317 | 4/2000 |
| JP | 2006-504160 | 2/2006 |
| WO | WO 98/00791 | 1/1998 |
| WO | WO 02/11344 | 2/2002 |
| WO | WO 2005/001687 | 1/2005 |
| WO | WO 2005/086906 | 9/2005 |
| WO | WO 2008/124319 | 10/2008 |
| WO | WO 2009/039352 | 3/2009 |

OTHER PUBLICATIONS

Supplementary European Search Report issued in EP application No. 07813940, Nov. 26, 2009, 7 pages.

Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.

Vajracharya, Suvas et al., "Asynchronous Resource Management." Proceedings of the 15$^{th}$ International Parallel and Distributed Processing Symposium, Apr. 2001, 10 pages.

Control-M; New Dimension Software. User Manual. New Dimension Software Ltd., 1999.

Romberg, M., "UNICORE: Beyond Web-based Job-Submission," Proceedings of the 42nd Cray User Group Conference, Noordwijk (May 22-26, 2000).

"Unicenter AutoSys Job Management," Computer Associates, Copyright 2001.

Babaoglu, O et al., "Mapping parallel computations onto distributed systems in Paralex" Compuero '91. Advanced Computer Technology, Reliable Systems and Applications. 5$^{th}$ Annual European Computer Conference. Proceedings. Bologna, Italy May 13-16, 1991, Los Alamitos, CA, USA, IEEE Comput. Soc, US, pp. 123-130.

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the 27$^{th}$ ACM/IEEE. Jun. 24-28, 1990, pp. 46-51.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

European Search Report issued in application No. EP10003554, dated Sep. 24, 2010, 7 pages.

Gamma et al. "Design Patterns: Elements of Reusable Object-Oriented Software", Sep. 1999.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," 2$^{nd}$ Edition, Prentice Hall, Upper Saddle River, N.J., 1996, pp. 51-52, 255-280, 292-297.

International Search Report & Written Opinion issued in PCT application No. PCT/US01/23552, mailed Jan. 24, 2002, 5 pages.

International Search Report & Written Opinion issued in PCT application No. PCT/US06/24957, dated Jan. 17, 2008, 14 pages.

International Search Report & Written Opinion issued in PCT application No. PCT/US08/71206, mailed Oct. 22, 2008, 12 pages.

International Search Report & Written Opinion issued in PCT application No. PCT/US10/49966, dated Nov. 23, 2010, 8 pages.

International Search Report & Written Opinion received in PCT application No. PCT/US10/24036, mailed Mar. 23, 2010, 11 pages.

Jawadi, Ramamohanrao et al., "A Graph-based Transaction Model for Active Databases and its Parallel Implementation." U. Florida Tech. Rep TR94-0003, 1994, pp. 1-29.

Just et al., "Review and Analysis of Synthetic Diversity for Breaking Monocultures." Oct. 2004, ACM, pp. 23-32.

Kebschull, U. et al., "Efficient Graph-Based Computation and Manipulation of Functional Decision Diagrams." University of Tubingen, 1993 IEEE, pp. 278-282.

Krahmer et al., "Graph-Based Generation of Referring Expressions." Mar. 2003, MIT Press, vol. 29, No. 1, pp. 53-72.

Li, Xiqing et al., "A Practical External Sort for Shared Disk MPPs." Proceedings of Supercomputing '93, 1993, 24 pages.

Martin, David et al., "Models of Computations and Systems—Evaluation of Vertex Probabilities in Graph Models of Computations." Journal of the Association for Computing Machinery, vol. 14, No. 2, Apr. 1967, pp. 281-299.

Ou, Chao-Wei et al., "Architecture-Independent Locality-Improving Transformations of Computational Graphs Embedded in $k$-Dimensions." Proceedings of the 9$^{th}$ International Conference on Supercomputing, 1995, pp. 289-298.

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02>, 5 pages.

Stanfill, Craig, "Massively Parallel Information Retrieval for Wide Area Information Servers." 1991 IEEE International Conference on Systems, Man and Cybernetics, Oct. 1991, pp. 679-682.

Stanfill, Craig et al., "Parallel Free-Text Search on the Connection Machine System." Communications of the ACM, vol. 29, No. 12, Dec. 1986, pp. 1229-1239.

Stanfill, Craig, "The Marriage of Parallel Computing and Information Retrieval." IEE Colloquium on Parallel Techniques for Information Retrieval, Apr. 1989, 5 pages.

Supplemental European Search Report issued in application No. EP08796632, dated Sep. 24, 2010, 6 pages.

Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.

International Search Report & Written Opinion received in PCT application No. PCT/US2011/040440, mailed Oct. 12, 2011, 13 pages.

Japanese Office Action, with English Translation, JP application No. 2009-523997, mailed Oct. 23, 2012, 7 pages.

Japanese Office Action, with English Translation, JP application No. 2008-519474, mailed Sep. 25, 2012, 8 pages.

Shoten, Iwanami, "Encyclopedic Dictionary of Computer Science," (with English Translation), May 25, 1990, p. 741.

Supplemental European Search Report issued in application No. EP06774092, dated Dec. 19, 2012, 5 pages.

"Topological sorting," Wikipedia, accessed Dec. 10, 2012, 2 pages.

Japanese Office Action, with English Translation, JP application No. 2011-000948, mailed Jan. 8, 2013, 11 pages.

European Search Report issued in application No. EP10741775, dated Nov. 14, 2012, 4 pages.

Russell, Nick, et al., "Workflow Control-Flow Patterns A Revised View," Workflow Patterns Initiative, 2006, pp. 1-134.

van der Aalst, W.M.P., et al., "Workflow Patterns," Distributed and Parallel Databases, 14, 5-51, 2003.

Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.

Evripidou, Paraskevas, et al., "Incorporating input/output operations into dynamic data-flow graphs," Parallel Computing 21 (1995) 1285-1311.

Extended European Search Report, EP 12165575, mailed May 10, 2013, 9 pages.

(56) References Cited

OTHER PUBLICATIONS

Frankl, Phyllis G., et al., "An Applicable Family of Data Flow Testing Criteria," IEEE Transactions on Sofrware Engineering, vol. 14, No. 10, Oct. 1988, pp. 1483-1498.

Whiting, Paul G., et al., "A History of Data-Flow Languages," IEEE Annals of the History of Computing, vol. 16, No. 4, 1994, pp. 38-59.

Japanese Office Action, with English Translation, JP application No. 2010-518415, mailed Feb. 21, 2013, 11 pages.

"Visual Lint: Squash Bugs Early with Interactive C/C++, C# and Java Code Analysis for Microsoft Visual Studio and Eclipse," [retrieved from the internet Dec. 3, 2012: www.riverblade.co.uk/products/visual_lint.] (2 pages).

* cited by examiner

DISTRIBUTING SERVICES IN GRAPH-BASED COMPUTATIONS

CLAIM OF PRIORITY

This application claims priority to Provisional Patent Application Ser. No. 60/836,745, filed on Aug. 10, 2006, the entire contents of which are hereby incorporated by reference.

TECHNICAL FIELD

This invention relates to distributing services in graph-based computations.

BACKGROUND

Complex business systems typically process data in multiple stages, with the results produced by one stage being fed into the next stage. The overall flow of information through such systems may be described in terms of a directed data flow graph, with vertices in the graph representing components (either data files or processes), and the links or "edges" in the graph indicating flows of data between components.

Graphs also can be used to invoke computations directly. The "CO>OPERATING SYSTEM®" with Graphical Development Environment (GDE) from Ab Initio Software Corporation, Lexington, Mass. embodies such a system. Graphs made in accordance with this system provide methods for getting information into and out of individual processes represented by graph components, for moving information between the processes, and for defining a running order for the processes. This system includes algorithms that choose interprocess communication methods and algorithms that schedule process execution, and also provides for monitoring of the execution of the graph.

A distributed services architecture allows computer programs to access capabilities of other programs through a network interface, such as the world wide web, without having to incorporate the functionalities of those programs into their own operating code.

SUMMARY

In general, in one aspect, a service request is processed according to a computation graph associated with the service by receiving inputs for the computation graph from a service client, providing the inputs to the computation graph as records of a data flow, receiving output from the computation graph, and providing the output to the service client.

Implementations may include one or more of the following features.

Receiving the inputs includes identifying the inputs within a service request from the service client, and providing the inputs to the computation graph includes associating a request identifier with the service request, providing a work element including the inputs to the computation graph, associating the request identifier with the work element, and communicating the association of the request identifier with the work element to an output node. Identifying the inputs includes extracting the inputs from an encapsulated request. The encapsulated request includes a SOAP request. Receiving the output includes receiving a work element including outputs from the computation graph, and identifying a request identifier associated with the work element, and providing the output to the service client includes generating a service response corresponding to the service request identified by the request identifier, the service response including the outputs included in the work element. Generating the service response includes embedding the outputs in an encapsulated response. The encapsulated response includes a SOAP response.

A second service request is processed according to the computation graph by receiving second inputs for the computation graph from a second service client, providing the second inputs to the computation graph as records of a second data flow, receiving second output from the computation graph, and providing the second output to the second service client; and in the computation graph, processing the first inputs and the second inputs concurrently. Processing the first inputs and the second inputs concurrently includes identifying a first subgraph applicable to the first inputs, processing the first inputs in the first subgraph, identifying a second subgraph applicable to the second inputs, processing the second inputs in the second subgraph, receiving first outputs from the first subgraph, and receiving second outputs from the second subgraph, in which the first subgraph and the second subgraph are executed simultaneously. Processing the first inputs and the second inputs concurrently includes identifying a first instance of a subgraph as available, processing the first inputs in the first instance of the subgraph, identifying a second instance of the subgraph as available, processing the second inputs in the second instance of the subgraph, receiving first outputs from the first instance, and receiving second outputs from the second instance, in which the first instance of the subgraph and the second instance of the subgraph are executed simultaneously.

In general, in one aspect, a data flow is processed in a graph-based computation by identifying a first graph applicable to a first record in the data flow, identifying a first subgraph applicable to a first work element in the first record, processing the first work element in the first subgraph, identifying a second subgraph applicable to a second work element in the first record, processing the second work element in the second subgraph, receiving a first output work element from the first subgraph, receiving a second output work element from the second subgraph, associating the first output work element with the first record, and associating the second output work element with the first record, in which the first subgraph and the second subgraph are executed at least partially simultaneously.

In general, in one aspect, a data flow is processed in a graph-based computation by identifying a first graph applicable to a first record in the data flow, identifying a first instance of a subgraph as available, processing a first work element in the first record in the first instance of the subgraph, identifying a second instance of the subgraph as available, processing a second work element in the first record in the second instance of the subgraph, receiving a first output work element from the first instance, receiving a second output work element from the second instance, associating the first output work element with the first record, and associating the second output work element with the first record, in which the first instance of the subgraph and the second instance of the subgraph are executed at least partially simultaneously.

Other features and advantages of the invention will be apparent from the description and the claims.

DESCRIPTION

FIGS. 3-5*b* show graphs for providing distributed services.

In some examples, there are two ways that graph-based computations interact with distributed services. In some examples, a graph calls a service and relates to the service as if the service were a node in the graph. In other examples, an application relates to a graph such that the graph provides a service. The two cases may be carried out simultaneously. For example, a graph that is providing services to one application may itself call another service to perform part of its computation. The service that one graph calls may be provided by another graph, such that the first graph calls the second rather than containing it as a subgraph, for example.

Figure 1A:
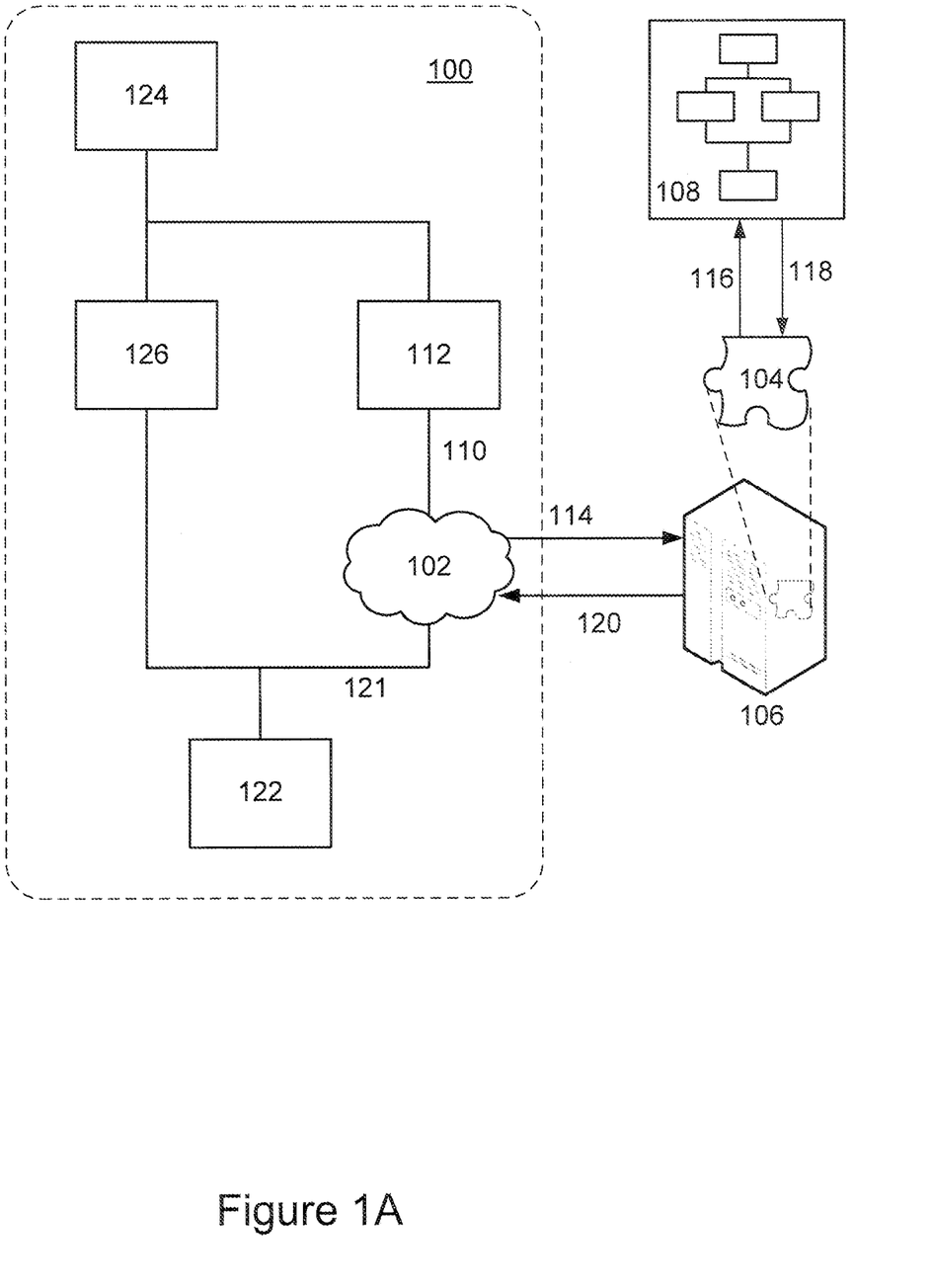
FIGS. 1A and 2 show schematic diagrams of a system for distributed services.

In some examples, as shown in FIG. 1A, a service node 102 of a graph-based computation 100 operates by calling a service in a distributed service-oriented architecture. That is, when the service node 102 is executed, it calls a service 108, external to the graph 100, as a client of the service. For example, the service node 102 may access a web service using a combination of one or more of SOAP, HTTP, XML, WSDL and the like to communicate with a web service plug-in 104 hosted on an application server 106 to reach the external service 108. The external service 108 may itself be a graph-based computation, as described below. The service may be implemented in a distributed manner using any of a variety of methods for distributing computing tasks.

The service node 102 receives inputs 110 from other graph nodes, e.g., a node 112, in the native format of the graph-based computation 100, such as a record described in a data description language like Ab Initio's DML. The node 102 then formats its inputs 110 into a format appropriate for the type of web service it is using, such as a SOAP- or other type of encapsulation-based request, and transmits a service request 114 to the application server 106. A URL in the request 114 indicates which application server 106, plug in 104, and service 108 to send the request to. The request 114 can be sent in various ways, including by HTTP and RPC (remote procedure call). The plug-in 104 on the server 106 reformats the incoming request 114 as appropriate and transmits an appropriate call 116 to the external service 108.

After the service 108 performs whatever operations it was called for, it returns output 118 to the plug-in 104. The plug-in 104 reformats the output 118 of the service 108 into an appropriate service response 120 to return to the service node 102. The service node 102 reformats the response 120 into an appropriate output format and passes output 121 on to downstream graph nodes, e.g., a node 122. From the point of view of the other graph nodes 112, 122, 124, 126, the distributed service node 102 can participate in the graph computation 100 just as any other node. The structure and organization of the server 106, such as the nature of the plug in 104 and how it communicates to the service 108 (or whether, for example, a plug-in 104 is used at all) do not matter to the graph nodes, as long as the service node 102 receives the type of response 120 it is expecting. The server 106, plug-in 104, and service 108 may themselves be a graph-based computation server, plug-in, and graph, respectively, as described below.

In some examples, the graph 100 is pipelined, meaning that each node operates on a separate record, or set of records, of a larger flow of input records in sequential phases of the pipeline. In a given phase, each subsequent node works on a record, or set of records, that it received from a previous node, while each previous node works on the next record or set of records in the input flow. The service node 102 modifies this by accepting additional records and dispatching the work required by each of them to the service 108 before responses corresponding to previous service requests have been received. This is possible where, for example, the service 108 is capable of processing multiple concurrent requests. Records may be composed of separate or separable work elements, which may be handled in pipelined stages as described for records.

If the different requests 114 take different amounts of time to process, the service node 102 may receive the responses in a different order than its inputs 110 were received. This allows multiple services having different processing times to be accessed by a single node 102. A service node such as 102 may optionally be configured to provide its outputs 121 in a different order than its inputs 110 were received. To allow such concurrent processing without using a multi-threaded process for the service node 102 and without including data describing the entire state of the graph 100 in each request 114 (so that it can be used upon its return), the service node 102 keeps track of which requests 114 are outstanding and matches them to incoming responses 120. In some examples, the graph is pipelined such that each record or work element is handled by one node at a time and separate nodes handle separate records or work elements, but multiple records or work elements may be allocated to the single service node 102 at any given time.

In a pipelined graph, the service node 102 treats each record, e.g., each record of a data flow, as an individual transaction. The corresponding request is generated based on the fields in that single input record. Some of the fields may define attributes of the request, such as the URL, while others are passed on as embedded data.

Figure 1B:
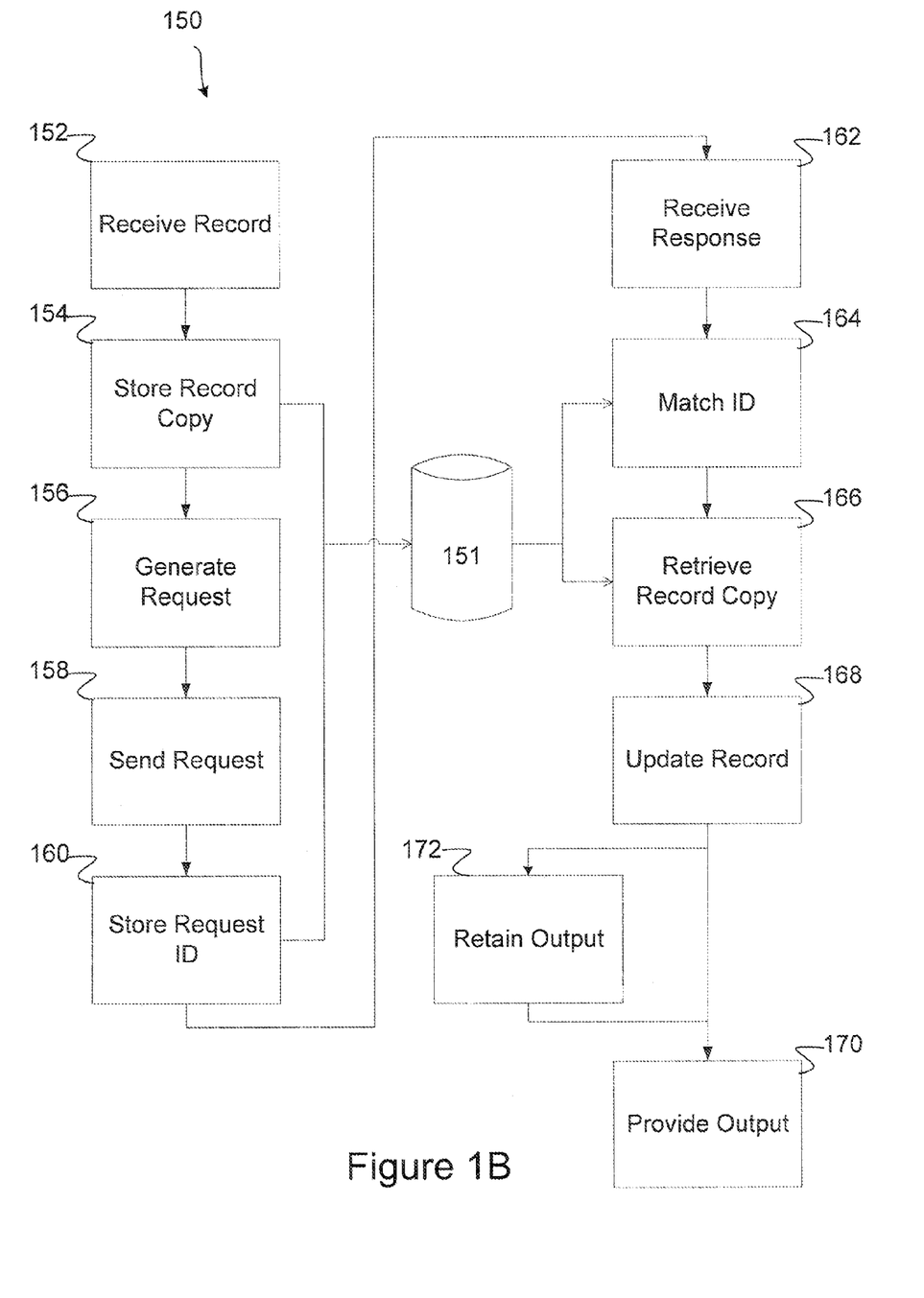
FIG. 1B shows a flow chart of a process for calling a service.

In some examples, as shown in a process 150 in FIG. 1B, the relationships between requests 114 and responses 120 are tracked in a memory accessible by the service node 102. The memory may be a vector, table, file, or other such data structure. When an input record 110 is received 152, a copy of the record 110 is stored 154 to the memory 151. The service node 102 then generates 156 the request 114, sends 158 the request to the service, and writes 160 the ID of the request to the memory, associating it with the stored copy of the record 110. When a response 120 is received 162, it includes an ID corresponding to one of the outstanding requests. The service node 102 matches 164 that ID to an ID in the memory and retrieves 166 the copy of the corresponding input record 110. The record is updated 168 according to the response 120, generating the output 121. If the service node 102 is configured to produce outputs in the order in which they become available (not necessarily the same order as that in which the inputs were received), then the output 121 is provided 170 to the next node 122. If the service node 102 is configured to produce results in the same order as its inputs, the output may be retained 171 in a memory until all outputs corresponding to previous records have been written 121, at which time it can be written 121.

Figure 2:
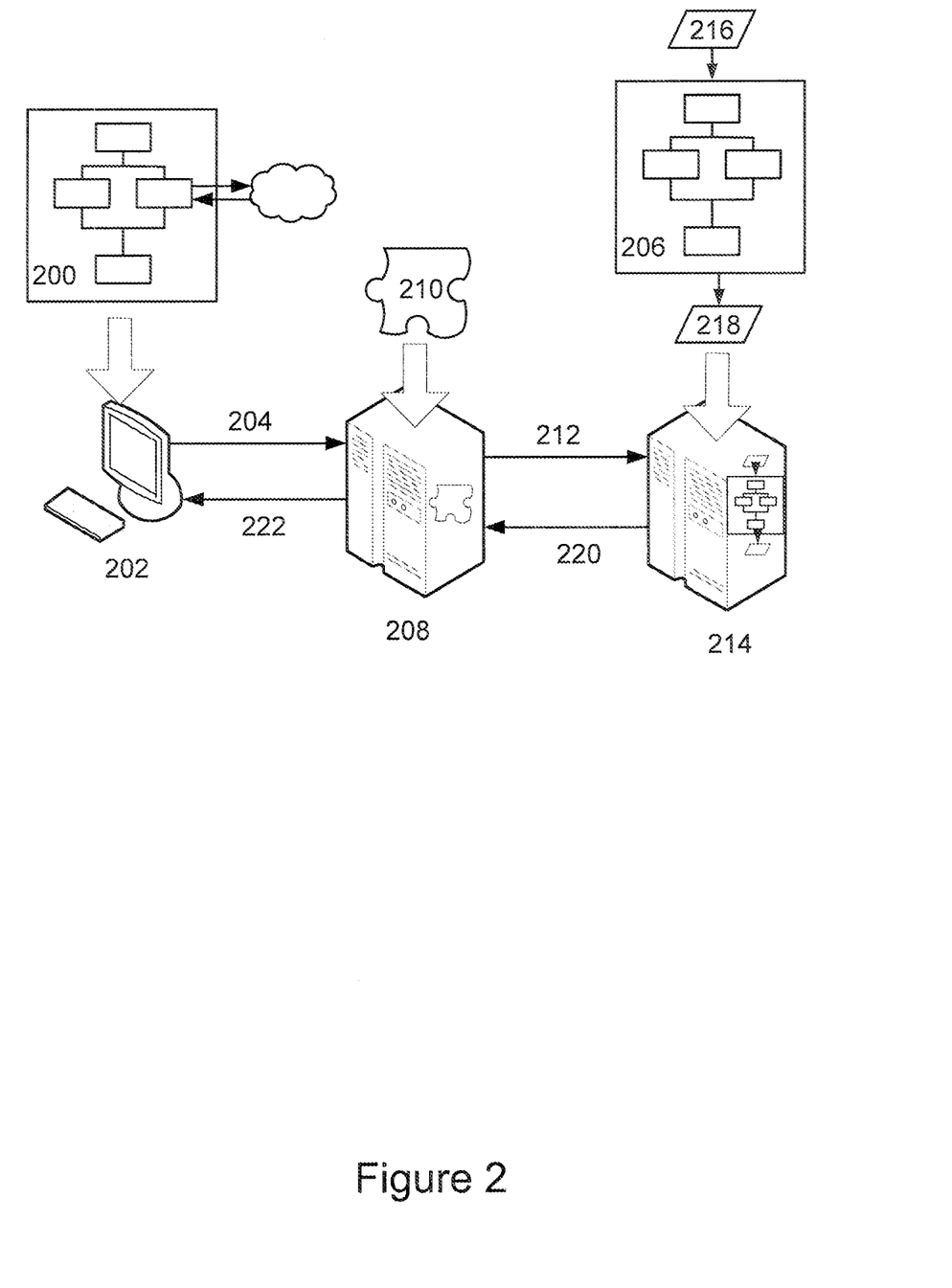

In some examples, a graph-based computation is provided as a network service. We refer to the graph that provides a network service as a provider graph. As shown in FIG. 2, a process 200 running on a client system 202, which may be a graph computation but could be any other type of application, sends a request 204 for a computation requiring the use of a provider graph 206 to an application server 208. The request 204 is sent in a format appropriate for a web-based or other network service, such as a SOAP, HTTP, or RPC request. The request 204 is received in a service interface of the application server 208 according (for SOAP or HTTP requests) to the instructions of a web service plug-in 210 running on the application server 208.

The web services plug-in 210 is an application that processes requests and responses between web services clients and the graphs providing the services. The plug-in 210 is installed and executed on the application server 208. The web services plug-in may communicate with a set of several web services provider graphs. Each of the graphs is included in a services list accessed by the plug-in. The plug-in uses a URL, for example, in a client HTTP request message, to direct the request to a particular graph.

The plug-in 210 formats the service request 204 into an appropriate request 212 for graph processing, such as an RPC request, and forwards this request 212 to a graph server 214 which is hosting the graph 206. In some examples, RPC calls are made straight through from the client 200 to the provider graph 206. At the graph server 214, the inputs 216 included in the request 212 are provided to the graph 206, which is executed to produce outputs 218. The graph server 214 sends the outputs 218 in an appropriate form of graph output 220, such as an RPC response, to the application server 208 and its web service plug-in 210. The plug-in 210 reformats the graph output 220 into a web-services response 222 in a complementary format to the original request 204. The outputs are returned to the client or other entity that called the service in the usual manner of the appropriate network service. The process on the client system 202 then handles the response as it would any other web-based or network service response.

The graph may process inputs using any or all of pipeline parallelism, component parallelism, and data parallelism. That is, multiple sets of inputs may be received, and these may be interleaved in pipeline stages, or they may be processed concurrently by different groups of components, perhaps after partitioning.

In some examples, the public or external interface to a provider graph is defined by a WSDL (Web Services Description Language) file. A WSDL file contains XML-based descriptions of all the messages and operations needed to interact with the provider graph. WSDL files may be defined by organizations, industries, or any other body, for accessing web services relevant to that body. WSDL files may also be customized for a particular implementation. In some examples, a WSDL file is generated from record formats and type definitions of components in subgraphs related to the provider graph. In some examples, a single provider graph includes multiple subgraphs that perform separate services. The WSDL file crated from such subgraphs allows a client to access each of the services provided by the provider graph's subgraphs.

Within the provider graph, the incoming service request input is converted into the internal language of the service-providing subgraph. For example, as shown in FIG. 3, incoming messages 306, such as SOAP requests, include data payloads 308 that require processing by actions specified in the messages. The payloads 308 may be, for example, DML-described records to be processed by graphs within the action processors 300a, 300b. An interface layer 301 parses the incoming messages in whatever format they are in and provides appropriate messages to the graph nodes in whatever format they require. On the output side, the interface layer 301 works in the reverse.

Once the message 306 is translated, a Partition by Action Type node 302 interprets the action specified in the message 306 and sends the record 308 in the data payload to the appropriate action processor 300a or 300b. In some examples, the partition node 302 does not accept the next incoming message 307 until a gather node 304 informs it that the work for the previous record 308 has been output from the action processor 300a or 300b.

In some examples, to achieve concurrency in handling of messages, e.g., service requests, the partition node 302 is configured to partition the action records corresponding to the service requests. This allows multiple requests to be handled simultaneously, if they don't require the same action processor. For example, if a first record 308 requires the action processor 300a, and a second record 310 requires the action processor 300b, the partition node 302 sends the second record 310 to the action processor 300b without waiting for the gather node 304 to report that the first record 308 has completed its processing.

The gather node 304 receives the processed records 308 and 310 from the action processors 300a and 300b and packages them into response messages 312 and 313 containing the processed records 308' or 310' as data payloads. If the partition node 302 is partitioning transactions, so that multiple records may be processed at once, it is possible that the processed records 308' or 310' may be received by the gather node 304 in a different order than their corresponding request messages 306 and 307 were received. An interface 315 between the partition node 302 and gather node 304 allows the gather node to associate the output records 308', 310' with the corresponding inputs 308, 310 so that the reply messages 312 and 313 are sent back to the correct client.

The action processors 300a, 300b can take any form. As noted above, the records 308, 310 may be in any format, e.g., DML-described. In such a case, the interface layer 301 translates the incoming language, such as SOAP, into the DML format used by the action processors. In some examples, an intermediate language may be used to express the inputs between the interface layer 301 and the partition and gather nodes 302, 304.

Figure 3A:
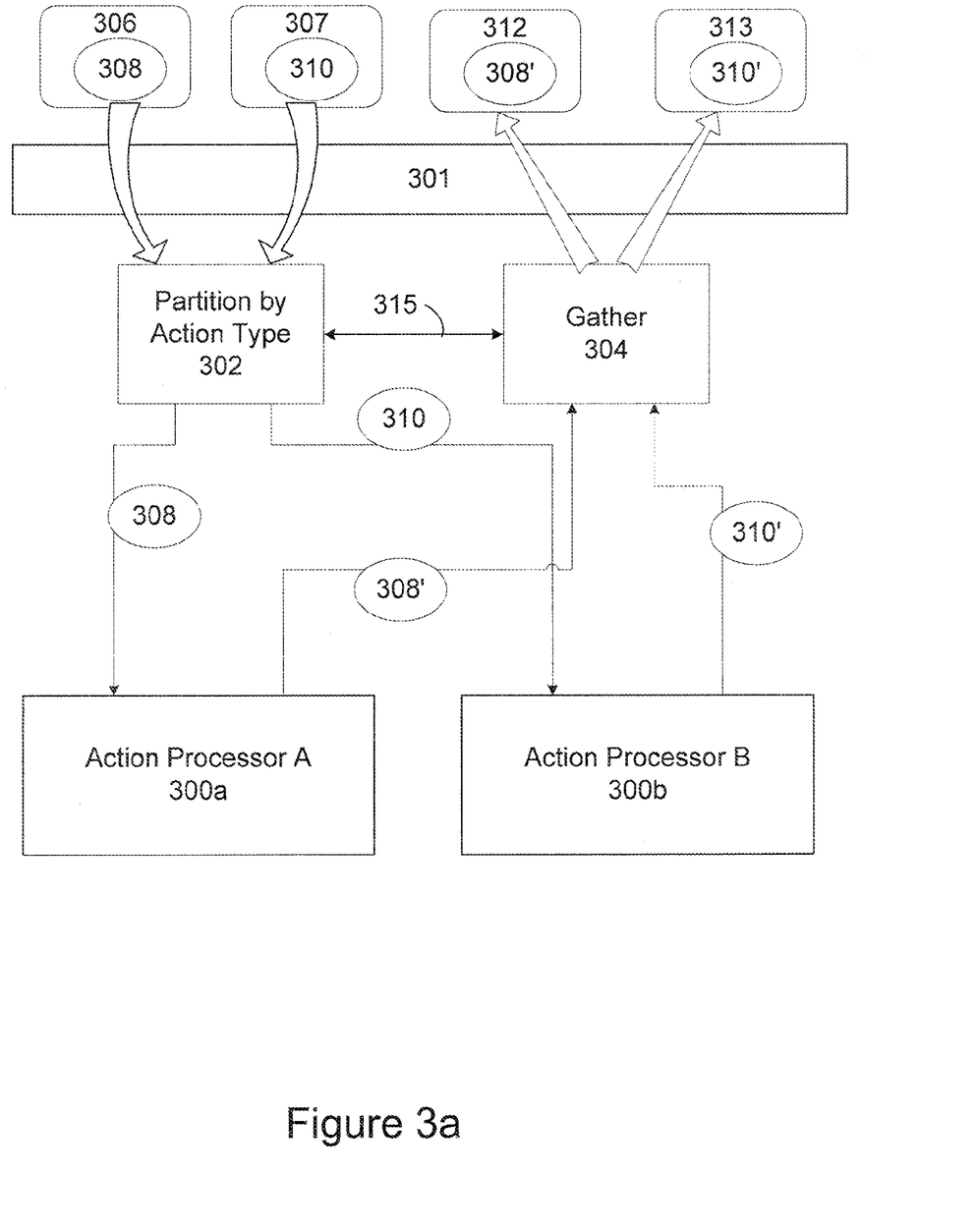
Figure 3B:
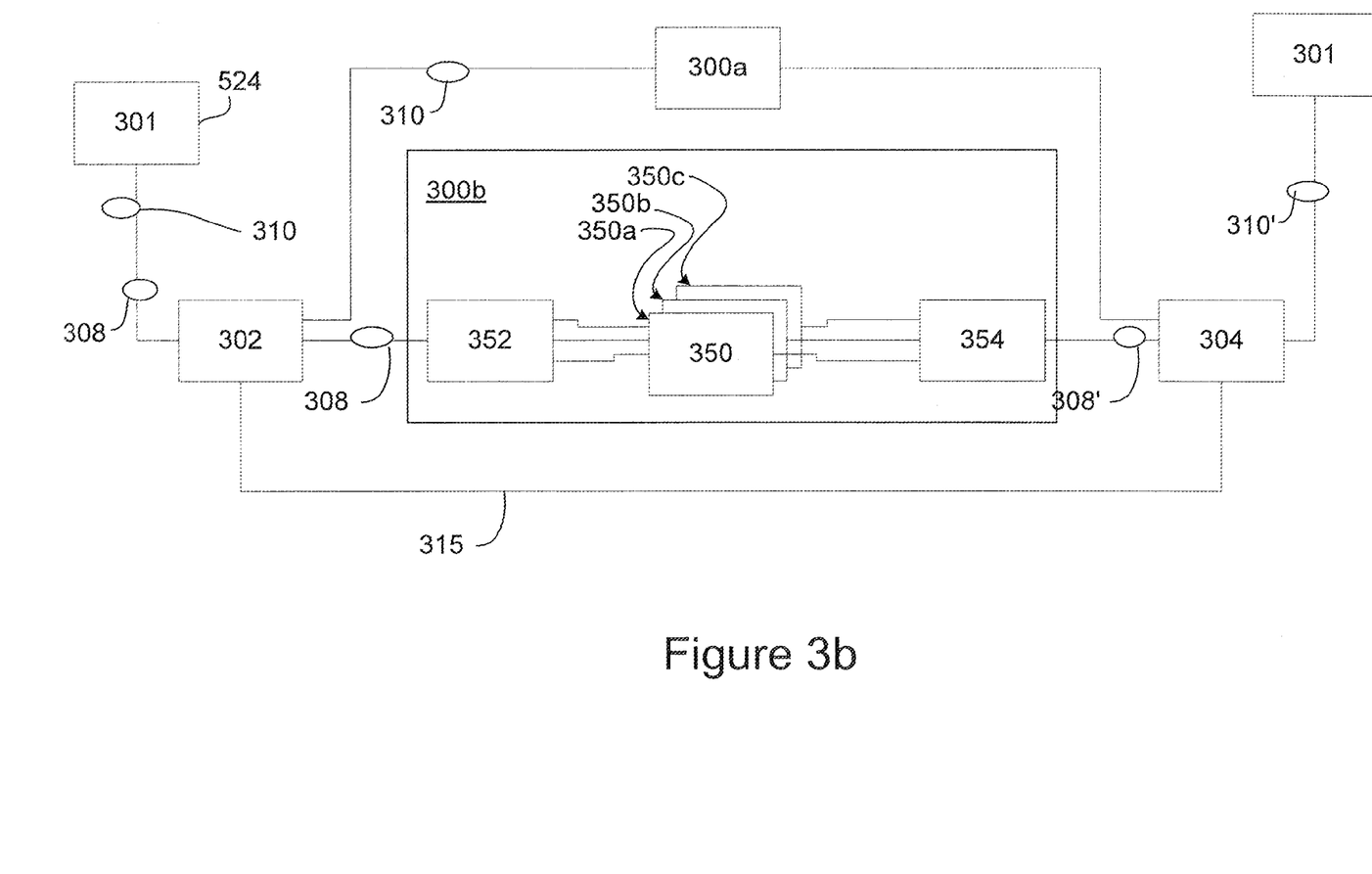

In some examples, when gather node 304 is configured to receive records 308' and 310' in the order they arrive, processing of actions may be further partitioned within the action processors, as shown for the action processor 300b in FIG. 3b. The partition by action type node 302 receives request messages 306 and 307 and routes their records 308 and 310 to the appropriate action processor 300a or 300b. Within the action processor 300b, records are received by another partition node 352 that partitions the records across a pool. Pools refer to multiple instances 350a, 350b, 350c, of a subgraph 350 that carries out the processing of the action processor 300b. Each instance can process a different record concurrently with the other instances. By partitioning different records 308, 320 to different instances, the action processor 300b can handle multiple records concurrently, allowing the partition node 302 to send the next record 320 to the action processor before the previous record 308 has come out. A gather node 354 is paired to the partition node 352 so that the nodes can track which instances 350a, 350b, 350c are in use, and use idle instances when possible, increasing concurrency and performance. The gather node 304 still receives the outputs 308', 310' of the action processors 300a, 300b and supplies the appropriate output messages 312, 313 back to the client through the interface layer 301.

The output records 308' and 310' and output messages 312 and 313 may be returned in a different order than the input requests 306 and 307 were received. For example, if the input record 310 contained fewer work elements (described below) than the record 308, then the output response 313 may be returned first even though it corresponds to the later-received request 307. The output order may also vary based on the complexity of the input data, if the action processors 300a, 300b work in such a way that records may be processed out of order or at different rates depending on their complexity, or other factors.

Figure 4:
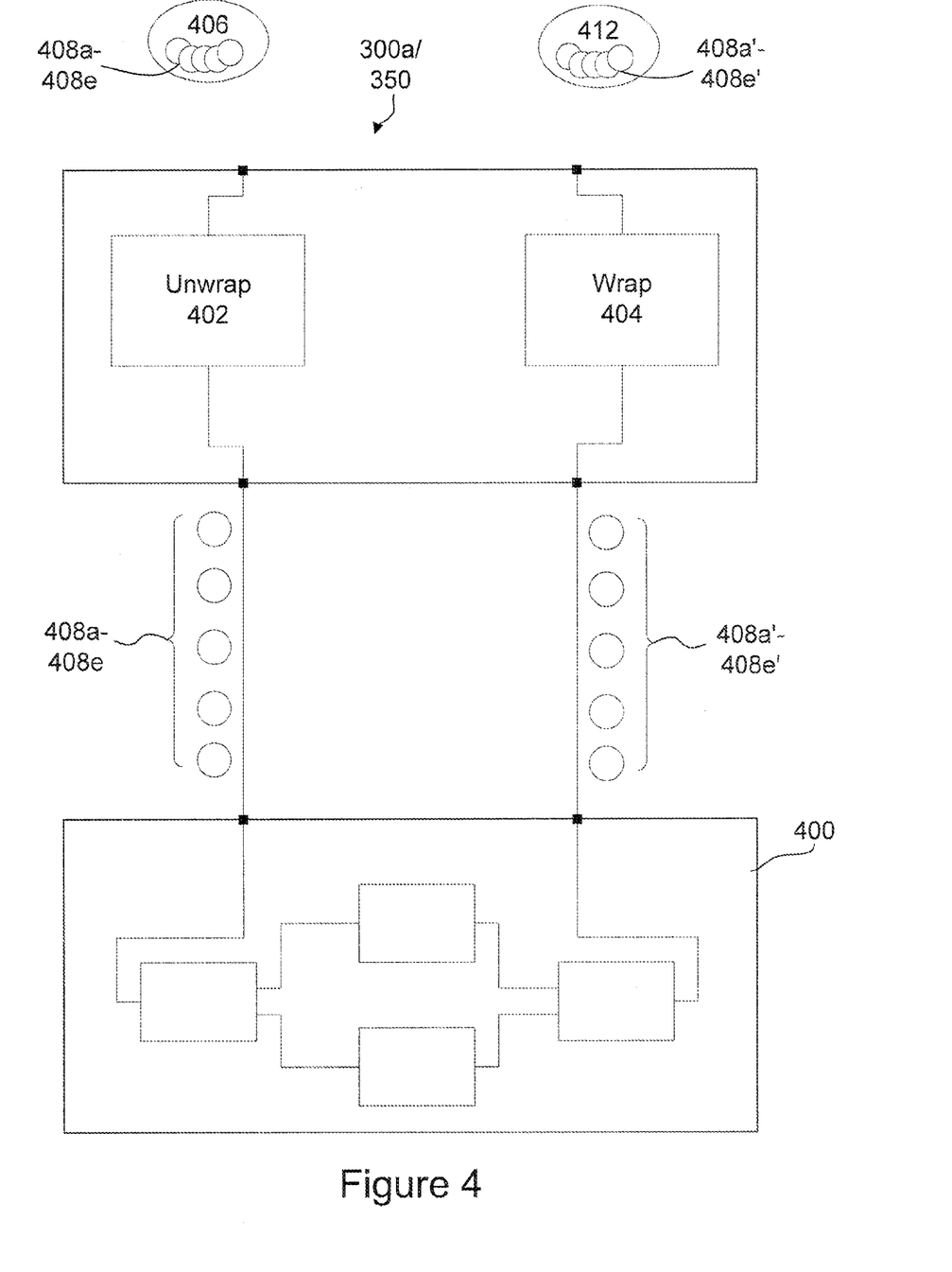

In some examples, as shown in FIG. 4, the record 406 of a single service request includes data that is processed by the provider graph as a data flow, that is, as multiple work elements 408a-408e that move through the graph one after the other. The action processor 300a (if records aren't further partitioned) or the subgraph 350 (if they are) includes an unwrap node 402 that decomposes the input record 406 into its individual work elements 408a-408e and sends the work elements into the service-providing subgraph 400 as appropriate. A corresponding wrapping node 404 recombines the flow of output work elements 408a'-408e' into a single response 412 to return to the client that send the request 406

Figure 5A:
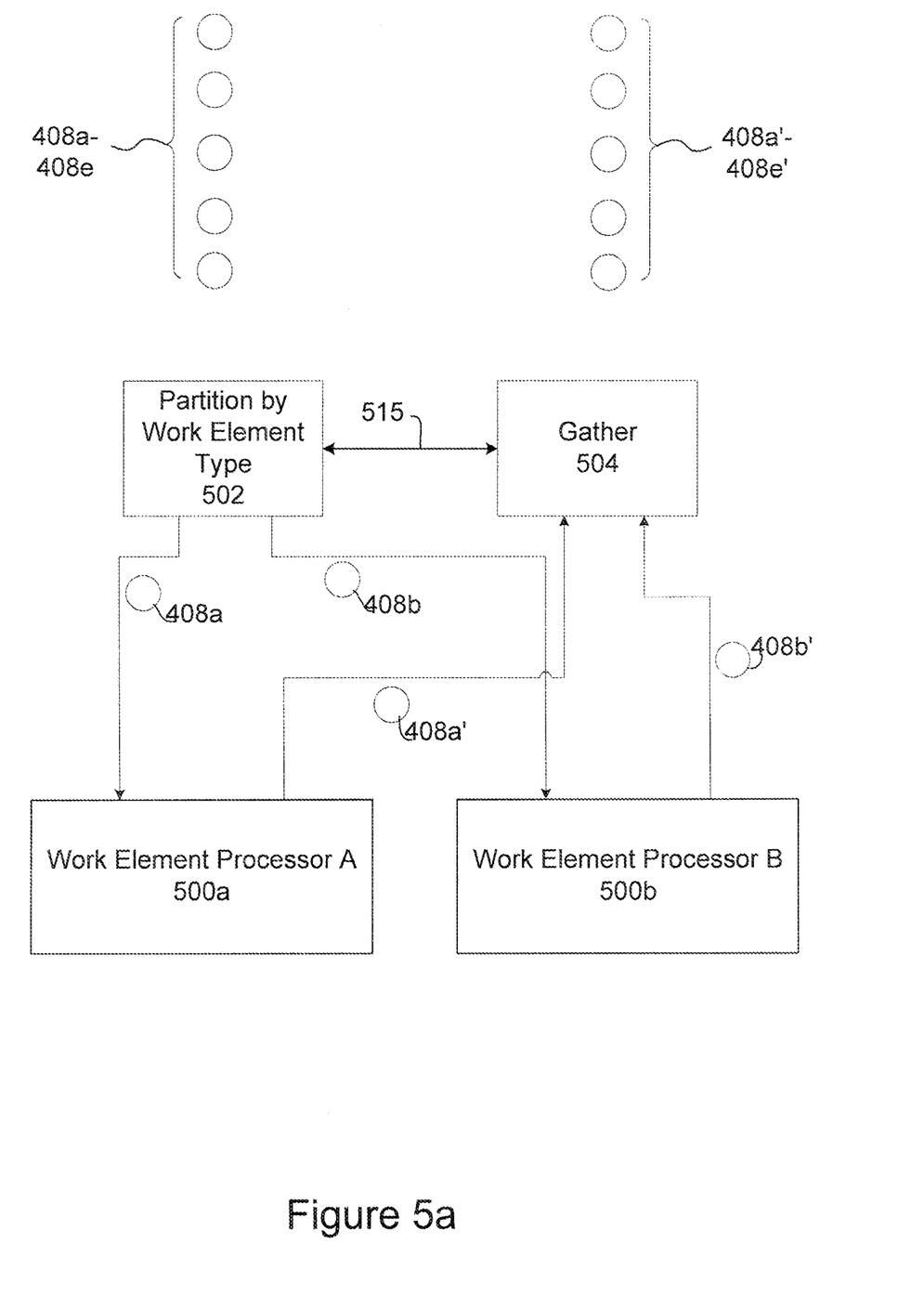

In some examples, once actions are partitioned and unwrapped into work elements, the work elements are also processed concurrently, as shown in FIG. 5a. As with the records in FIG. 3a, a partition node 502 partitions the work elements 408a-408e according to their type, that is, which work element processor 500a or 500b is required to process each. If the order in which work elements are processed matters, then the partition node 502 sends the work elements 408 to the processors 500a and 500b one at a time (possibly partitioning each work element to use both processors), waiting on the gather node 504 to inform it as each output work element 408' is received. In some examples, the order of processing does not matter, and the partitioning node sends one work element to each processor 500a and 500b, assuming the work elements need different processors.

As the work elements 408a'-408e' leave the processors 500a, 500b, they are accumulated by the gather node 504. Whenever all the work elements from one record 406 have been collected, they are combined back into the output record 412. Communication 515 between the partition node 502 and the gather node 504 allows the partition node 502 to track which work element processors are available for additional work elements.

Techniques for handling multiple concurrent data flows are also described in U.S. Pat. No. 6,584,581, issued Jun. 24, 2003, and U.S. Pat. No. 6,654,907, issued Nov. 25, 2003, the entire contents of which are hereby incorporated by reference.

Figure 5B:
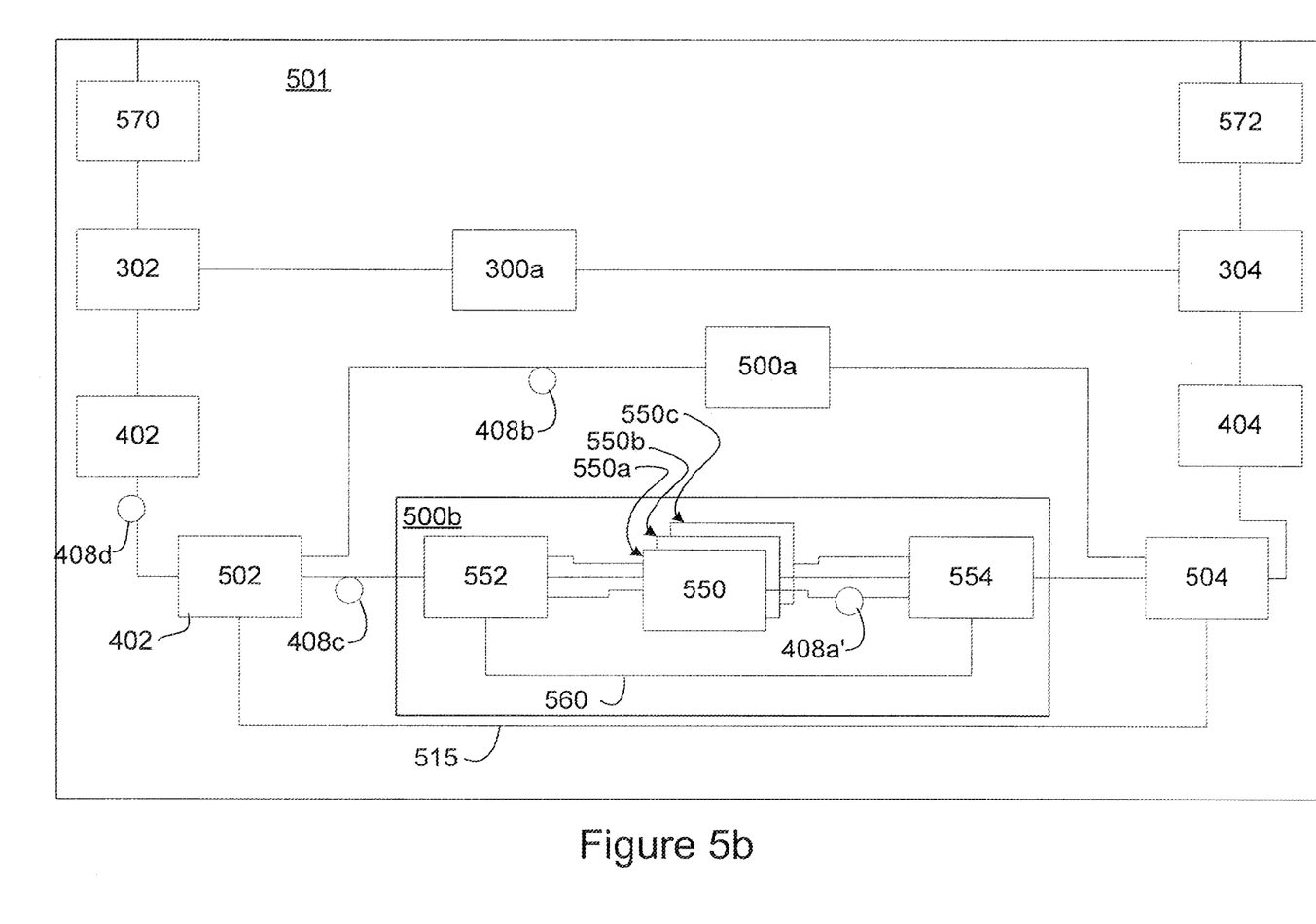

FIG. 5b shows details of how the work element processor 500b operates and how the subgraph of FIG. 5a relates to some of the higher-level nodes from FIGS. 3a, 3b, and 4, forming a provider graph 501. In some examples, as shown in FIG. 5b, the work element processor 500b further partition work elements to be operated on by multiple instances 550a, 550b, 550c of a subgraph 550. An instance 550a is selected from a pool of available instances of the processes associated with the graph nodes within the subgraph 550. Initially, a work element 408i is received by the partition node 552. The node 552 has access to the several instances 550a, 550b, 550c of the subgraph 550. The outputs of each instance are received by a gather node 554. The subgraph 550 may in turn call outside processes, such as services or other subgraphs, which may slow the handling of work by those nodes.

In previous systems, a partition component similar to node 552 would have partitioned a single work element 514 into separate components and sent one component to each instance 550i (where i is a, b, or c). The gather node 554 would have waited until each instance returned an output before combining the outputs into a single output for that work element, eliminating the possibility of concurrency. To maintain the pipeline, the partition node may have sent a delimiter through each instance after the work element so that the gather component would know that the work element was completed when the delimiter was received from each instance. In some examples, the delimiters would be sent after a set of multiple work elements that are handled by a given node in a given phase of the pipeline.

The partition by pool node 552, in contrast, sends the entire work element 408a to a single instance 550a for processing. The gather node 554 is configured to expect the output 408a' for that work element from only that one instance 550a. When the expected output 408a' is received (in some examples, followed by a delimiter), the gather node 544 provides the output to the next node 504. The gather node 554 does not wait for work element components or delimiters from the other instances 550b and 550c. This allows work element processor 500b to only use the instances 550i that are really needed for a given work element. As with the partitioning of transactional records by pool in FIG. 3b, partitioning work elements by pool also allows multiple work elements to be processed concurrently. Rather than waiting for the first work element 408a to finish processing and emerge from its instance 550a, the partition node 552 accepts another work element input 408c from the upstream node 502 and sends it to the next available instance 550b. In this way, multiple work elements 408a, 408b are processed at the same time, without the partitioning node 552 having to be multithreaded. In some examples, the partitioning node 552 informs the gather node 554, through a communication link 560, about what work elements are in each instance, so that the gather node 554 knows what to expect and can relate the output elements 408a', 408c' to the input work elements 408a, 408c.

Partitioning work elements between pools also allows the outputs 408a', 408b', 408c' to be returned out of order, relative to the inputs 408a, 408b, 408c. For example, if the data in the work element 408a causes the instance 550a to take longer process that work element than the instance 550b takes to process the work element 408c, the gather node 554 will receive the output 408c' before it receives the output 408a'. Because the two work elements 408a and 408c are independent of each other, the gather node 554 can send the output 408c' to the next node 504 without waiting for the output 408a'. This assumes that the other stages (e.g., partion/gather pair 502/504 and unwrap/wrap pair 402/404) are configured to accommodate changes in the order of work elements within the work element processor 500b. In some examples, it may be necessary or desirable to maintain the order, so the gather node 554 will hold the output 408c' until the output 408a' is received, and release them to the next node 504 in order. There are still advantages in such a computation, as the instances 550a, 550b, 550c are able to process several work elements simultaneously. This may be useful, for example, if the processing time of the subgraph 550 is longer than that of other nodes or subgraphs.

Partitioning transactions by action type and by pool and partitioning work elements by type and by pool all allow the graph to operate with internal parallelism—that is, with concurrent processing of related or unrelated work elements by different processing elements.

Partitioning by pool, partitioning by type, and other methods of processing requests and their work elements concurrently can be implemented in provider graphs so that the services the graphs provide can themselves handle concurrent inputs. For example, the graph 501 in FIG. 5b operates as a provider graph when the first node 570 is a subscribe node and the final node 572 is a publish node paired to the subscribe node 570. The subscribe node 570 receives requests 574 including the inputs 406 and forwards the inputs 406 to the partition node 402. The subscribe node 570 coordinates with the publish node 572 to match the outputs 412 with the inputs 406 and package them into appropriate responses 576 (i.e., making sure that each response goes to the client that made the call). Because the graph 501 handles concurrent records and concurrent work elements, the subscribe node 570 can continue accepting input requests 574 without waiting for the publish node 572 to receive the outputs 412. Using subgraphs that partition requests according to action type allows the single provider graph 501 to provide multiple services.

In some examples, the subscribe and publish nodes 570 and 572 assume that individual requests 574 are independent and the order in which responses 576 are returned does not matter, so the partition and gather nodes 402, 404 in the graph 501 are configured to not enforce order. If order does matter, either or both of the subscribe node 570 and the publish node 572 may make sure that responses 576 are returned the same order as the corresponding inputs 574 were received.

The techniques described herein may be implemented in one or more computer programs executing on one or more programmable computer systems each comprising at least one processor, at least one data storage system (including volatile and nonvolatile memory and/or storage elements), at least one input device or port, and at least one output device or port. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer system, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the present invention have been described. Nevertheless, it will be understood that various modifications may be made without departing from the spirit and scope of the invention. For example, a number of the function steps described above may be performed in a different order without substantially affecting overall processing.

Other implementations are within the scope of the following claims and other claims to which the applicant may be entitled.

What is claimed is:

1. A method including:
  processing a service request according to a computation graph associated with the service, the computation graph including multiple components interconnected by links representing data flows, by
    receiving inputs for the computation graph from a service client,
    providing the inputs to the computation graph as elements of a data flow,
    partitioning the elements into multiple sets, based on a type of action to be performed on elements in a given set,
    assigning each set to a different subgraph of the computation graph, each subgraph including at least some of the components and the links of the computation graph,
    partitioning each of one or more of the sets into subsets of elements,
    selecting, for each subset of a partitioned set, an instance of processes associated with the components of the subgraph assigned to the set, from a pool of instances identified as available, the instance including the components and the links of the subgraph,
    assigning each subset to its respective selected instance, and tracking that the instance is in use,
    receiving output from the subgraphs of the computation graph, and
    providing the output to the service client.

2. The method of claim 1 in which
  receiving the inputs includes identifying the inputs within a service request from the service client, and
  providing the inputs to the computation graph includes
    associating a request identifier with the service request,
    providing a work element including the inputs to the computation graph,
    associating the request identifier with the work element, and
    communicating the association of the request identifier with the work element to an output node.

3. The method of claim 2 in which identifying the inputs includes extracting the inputs from an encapsulated request.

4. The method of claim 3 in which the encapsulated request includes a SOAP request.

5. The method of claim 1 in which
  receiving the output includes
    receiving a work element including outputs from the computation graph, and
    identifying a request identifier associated with the work element, and
  providing the output to the service client includes
    generating a service response corresponding to the service request identified by the request identifier, the service response including the outputs included in the work element.

6. The method of claim 5 in which generating the service response includes embedding the outputs in an encapsulated response.

7. The method of claim 6 in which the encapsulated response includes a SOAP response.

8. The method of claim 1 also including:
  processing a second service request according to the computation graph by
    receiving second inputs for the computation graph from a second service client,
    providing the second inputs to the computation graph as elements of a second data flow,
    receiving second output from subgraphs of the computation graph, and
    providing the second output to the second service client; and
  in the computation graph, processing the first inputs and the second inputs concurrently.

9. The method of claim 8 in which processing the first inputs and the second inputs concurrently includes
  identifying a first subgraph applicable to the first inputs,
  processing the first inputs in the first subgraph,
  identifying a second subgraph applicable to the second inputs,
  processing the second inputs in the second subgraph,
  receiving first outputs from the first subgraph, and
  receiving second outputs from the second subgraph,
  in which the first subgraph and the second subgraph are executed simultaneously.

10. The method of claim 8 in which processing the first inputs and the second inputs concurrently includes
   identifying a first instance of a subgraph as available,
   processing the first inputs in the first instance of the subgraph,
   identifying a second instance of the subgraph as available,
   processing the second inputs in the second instance of the subgraph,
   receiving first outputs from the first instance, and
   receiving second outputs from the second instance,
   in which the first instance of the subgraph and the second instance of the subgraph are executed simultaneously.

11. The method of claim 1 in which an element of a data flow includes a record.

12. The method of claim 1 in which the inputs include records that each include one or more elements.

13. The method of claim 12 in which partitioning the elements into multiple sets includes unwrapping each record into multiple elements.

14. The method of claim 13 in which assigning each set to a different subgraph of the computation graph includes partitioning an unwrapped record into at least one set.

15. The method of claim 1, further including processing each subset in any order relative to the other subsets, using its respective assigned instance of the subgraph.

16. The method of claim 1 in which tracking that the instance is in use is based on gathering outputs of the instances.

17. The method of claim 1, further including receiving output from the instance of the subgraph, and tracking that the instance is available.

18. The method of claim 1 in which the output from the subgraphs is received by a gather node in the order that the output arrives.

19. The method of claim 18 in which the gather node identifies that an element has been processed by an instance of the subgraph based on receiving a delimiter from the instance of the subgraph.

20. The method of claim 1 in which partitioning into multiple sets of elements is in response to receiving and accepting one or more request messages associated with the inputs.

21. The method of claim 1 in which a first partition node partitions into multiple sets of elements and a second partition node partitions into subsets of elements.

22. The method of claim 21 in which the partition node sends a delimiter to an instance of the subgraph after sending an element to the instance of the subgraph.

23. The method of claim 1 in which a subset is assigned to the available instance of the subgraph before a previously assigned subset is received as output from the subgraph.

24. The method of claim 1 in which providing the output to the service client includes sending one or more output messages through an interface layer.

25. The method of claim 1 in which at least one of the different subgraphs in the computation graph is called as an external service.

26. The method of claim 1 in which another computation graph calls the subgraph as an external service.

27. The method of claim 1 in which the computation graph provides a network service to the service client.

28. The method of claim 1 in which the computation graph participates as a node in a client computation graph operating on the service client.

29. The method of claim 1 in which the inputs are received by a service node that calls the service client.

30. The method of claim 29 in which the service node participates in computations of the computation graph.

31. The method of claim 30 in which the service node sends requests related to the computations to an external service.

32. The method of claim 1 in which the inputs are received by a web services plug-in that processes requests from the service client.

33. The method of claim 32 in which the web services plug-in is an external application that communicates with the computation graph.

34. The method of claim 32 in which the web services plug-in formats the received inputs for the computation graph and formats the provided outputs for the service client.

35. The method of claim 1 in which the service node provides the inputs to the computation graph in a native format of the graph.

36. The method of claim 1, wherein the computation graph is a directed data flow graph, with vertices in the computation graph representing components corresponding to either data or processes, and with links in the computation graph indicating flows of data between components, and each subgraph of the computation graph includes a subset of fewer than all of the components and links in the computation graph.

37. A system for processing a service request according to a computation graph associated with the service, the computation graph including multiple components interconnected by links representing data flows, the system including:
   means for receiving inputs for the computation graph from a service client,
   a processor configured to provide the inputs to the computation graph as elements of a data flow,
   means for partitioning the elements into multiple sets, based on a type of action to be performed on elements in a given set,
   means for assigning each set to a different subgraph of the computation graph, each subgraph including at least some of the components and the links of the computation graph,
   means for partitioning each of one or more of the sets into subsets of elements,
   means for selecting, for each subset of a partitioned set, an instance of processes associated with the components of the subgraph assigned to the set, from a pool of instances identified as available, the instance including the components and the links of the subgraph,
   means for assigning each subset to its respective selected instance, and tracking that the instance is in use,
   means for receiving output from the subgraphs of the computation graph, and
   means for providing the output to the service client.

38. A system for processing a data flow in a graph-based computation, the system including
   means for identifying a first computation graph applicable to a first record in the data flow, the computation graph including multiple components interconnected by links representing data flows,
   means for selecting a first instance of processes associated with components of a subgraph from a pool of instances identified as available, the subgraph including at least some of the components and the links of the first computation graph, and the instance including the components and the links of the subgraph,
   means for selecting a second instance from the pool of instances of the subgraph identified as available,
   first processors configured to process a first work element in the first record by the first instance of the subgraph and process a second work element in the first record by the second instance of the subgraph, means for identifying the second work element in the first record as capable of being processed independently from the first work element, means for receiving a first output work element from the first instance, means for receiving a second output work element from the second instance, and second processors configured to associate the first output work element with the first record and associate the second output work element with the first record, in which the first processors are configured to execute the first instance of the subgraph and the second instance of the subgraph at least partially simultaneously.

39. A method of processing a data flow in a graph-based computation including identifying a first computation graph applicable to a first record in the data flow, the computation graph including multiple components interconnected by links representing data flows, selecting a first instance of processes associated with components of a subgraph from a pool of instances identified as available, the subgraph including at least some of the components and the links of the first computation graph, and the instance including the components and the links of the subgraph, processing a first work element in the first record by the first instance of the subgraph, selecting a second instance from the pool of instances of the subgraph identified as available, identifying a second work element in the first record as capable of being processed independently from the first work element, processing the second work element in the first record by the second instance of the subgraph, receiving a first output work element from the first instance, receiving a second output work element from the second instance, associating the first output work element with the first record, and associating the second output work element with the first record, in which the first instance of the subgraph and the second instance of the subgraph are executed at least partially simultaneously.

40. The method of claim 39 in which associating the first and second output work elements with the first record includes gathering the output work elements.

41. The method of claim 40 in which gathering the output work elements includes collecting the output work elements and subsequently combining the work elements into the first record.

42. The method of claim 39, wherein the first graph is a directed data flow graph, with vertices in the first graph representing components corresponding to either data or processes, and with links in the first graph indicating flows of data between components, and the subgraph includes a subset of fewer than all of the components and links in the first graph.

43. A computer program, stored on a non-transitory computer-readable medium, for processing a service request according to a computation graph associated with the service, the computation graph including multiple components interconnected by links representing data flows, the computer program including instructions for causing a computer to:

receive inputs for the computation graph from a service client, provide the inputs to the computation graph as elements of a data flow, partition the elements into multiple sets, based on a type of action to be performed on elements in a given set, assign each set to a different subgraph of the computation graph, each subgraph including at least some of the components and the links of the computation graph, partition each of one or more of the sets into subsets of elements, select, for each subset of a partitioned set, an instance of processes associated with the components of the subgraph assigned to the set, from a pool of instances identified as available, the instance including the components and the links of the subgraph, assign each subset to its respective selected instance, and track that the instance is in use, receive output from the subgraphs of the computation graph, and provide the output to the service client.

44. The computer program of claim 43 in which receiving the inputs includes identifying the inputs within a service request from the service client, and providing the inputs to the computation graph includes associating a request identifier with the service request, providing a work element including the inputs to the computation graph, associating the request identifier with the work element, and communicating the association of the request identifier with the work element to an output node.

45. The computer program of claim 44 in which identifying the inputs includes extracting the inputs from a SOAP request.

46. The computer program of claim 43 in which receiving the output includes receiving a work element including outputs from the computation graph, and identifying a request identifier associated with the work element, and providing the output to the service client includes generating a service response corresponding to the service request identified by the request identifier, the service response including the outputs included in the work element.

47. The computer program of claim 46 in which generating the service response includes embedding the outputs in a SOAP response.

48. The computer program of claim 43 also including:

processing a second service request according to the computation graph by receiving second inputs for the computation graph from a second service client, providing the second inputs to the computation graph as elements of a second data flow, receiving second output from subgraphs of the computation graph, and providing the second output to the second service client; and in the computation graph, processing the first inputs and the second inputs concurrently.

49. The computer program of claim 48 in which processing the first inputs and the second inputs concurrently includes identifying a first subgraph applicable to the first inputs, processing the first inputs in the first subgraph, identifying a second subgraph applicable to the second inputs, processing the second inputs in the second subgraph, receiving first outputs from the first subgraph, and
receiving second outputs from the second subgraph,
in which the first subgraph and the second subgraph are executed simultaneously.

50. The computer program of claim 48 in which processing the first inputs and the second inputs concurrently includes
identifying a first instance of a subgraph as available,
processing the first inputs in the first instance of the subgraph,
identifying a second instance of the subgraph as available,
processing the second inputs in the second instance of the subgraph,
receiving first outputs from the first instance, and
receiving second outputs from the second instance,
in which the first instance of the subgraph and the second instance of the subgraph are executed simultaneously.

51. The computer program of claim 43 in which the inputs include records that each include one or more elements.

52. The computer program of claim 43, further including processing each subset in any order relative to the other subsets, using its respective assigned instance of the subgraph.

53. The computer program of claim 43 in which tracking that the instance is in use is based on gathering outputs of the instances.

54. The computer program of claim 43 further including receiving output from the instance of the subgraph, and tracking that the instance is available.

55. The computer program of claim 43 in which the output from the subgraphs is received by a gather node in the order that the output arrives.

56. The computer program of claim 55 in which the partition node sends a delimiter to an instance of the subgraph after sending an element to the instance of the subgraph.

57. The computer program of claim 43 in which a first partition node partitions into multiple sets of elements and a second partition node partitions into subsets of elements.

58. The computer program of claim 57 in which the gather node identifies that an element has been processed by an instance of the subgraph based on receiving a delimiter from the instance of the subgraph.

59. The computer program of claim 43 in which a subset is assigned to the available instance of the subgraph before a previously assigned subset is received as output from the subgraph.

60. The computer program of claim 43 in which at least one of the different subgraphs in the computation graph is called as an external service.

61. The computer program of claim 43 in which the computation graph provides a network service to the service client.

62. The computer program of claim 43 in which the computation graph participates as a node in a client computation graph operating on the service client.

63. The computer program of claim 43 in which the inputs are received by a web services plug-in that processes requests from the service client.

64. The computer program of claim 63 in which the web services plug-in is an external application that communicates with the computation graph.

65. The computer program of claim 63 in which the web services plug-in formats the received inputs for the computation graph and formats the provided outputs for the service client.

66. The computer program of claim 43 in which the service node provides the inputs to the computation graph in a native format of the graph.

67. The computer program of claim 43, wherein the computation graph is a directed data flow graph, with vertices in the computation graph representing components corresponding to either data or processes, and with links in the computation graph indicating flows of data between components, and each subgraph of the computation graph includes a subset of fewer than all of the components and links in the computation graph.

68. A computer program, stored on a non-transitory computer-readable medium, for processing a data flow in a graph-based computation, the computer program including instructions for causing a computer to:
identify a first computation graph applicable to a first record in the data flow, the computation graph including multiple components interconnected by links representing data flows,
select a first instance of processes associated with components of a subgraph from a pool of instances identified as available, the subgraph including at least some of the components and the links of the first computation graph, and the instance including the components and the links of the subgraph,
process a first work element in the first record by the first instance of the subgraph,
select a second instance from the pool of instances of the subgraph identified as available,
identify a second work element in the first record as capable of being processed independently from the first work element,
process the second work element in the first record by the second instance of the subgraph,
receive a first output work element from the first instance,
receive a second output work element from the second instance,
associate the first output work element with the first record, and
associate the second output work element with the first record,
in which the instructions cause the computer to execute the first instance of the subgraph and the second instance of the subgraph at least partially simultaneously.

69. The computer program of claim 68 in which associating the first and second output work elements with the first record includes gathering the output work elements.

70. The computer program of claim 69 in which gathering the output work elements includes collecting the output work elements and subsequently combining the work elements into the first record.

71. The computer program of claim 68, wherein the first graph is a directed data flow graph, with vertices in the first graph representing components corresponding to either data or processes, and with links in the first graph indicating flows of data between components, and the subgraph includes a subset of fewer than all of the components and links in the first graph.

* * * * *